– –

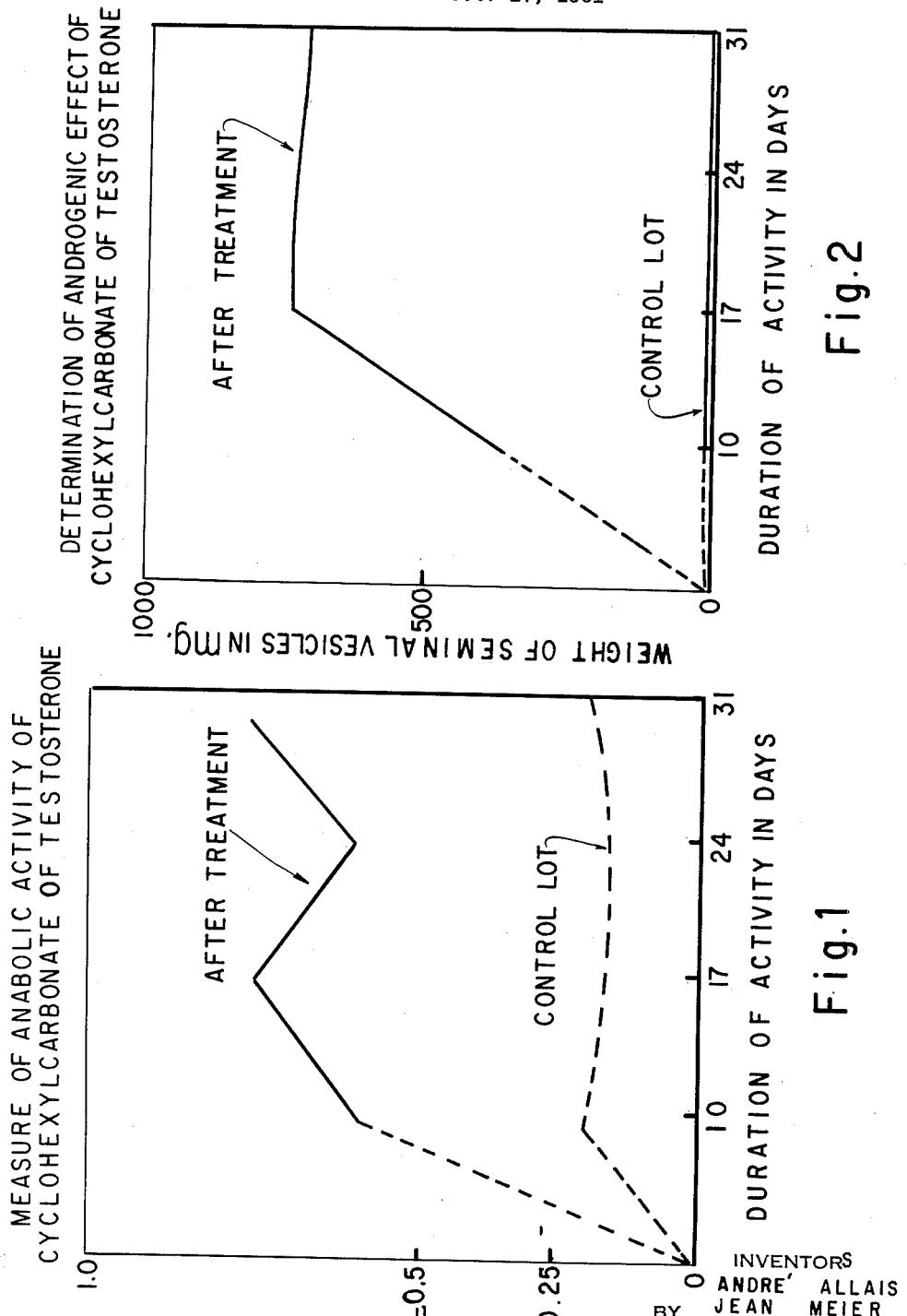

United States Patent Office 3,056,727
Patented Oct. 2, 1962

---

3,056,727
CYCLOHEXYLCARBONATES OF STEROIDS
André Allais, Paris, and Jean Meier, Coeuilly-Champigny, France, assignors, by mesne assignments, to Roussel-UCLAF, S.A., Paris, France, a corporation of France
Filed Oct. 17, 1961, Ser. No. 145,655
Claims priority, application France Oct. 27, 1960
13 Claims. (Cl. 167—74)

The invention relates to novel esters of hydroxylated steroids, namely the cyclohexylcarbonates of hydroxylated steroids. The invention also relates to a process for the preparation of the cyclohexylcarbonates of hydroxylated steroids.

Hydroxylated steroids have been esterified in the prior art with acids such as acetic acid and benzoic acid to prolong the duration of the steroid activity or to make the steroid more soluble. The novel cyclohexylcarbonates of the invention have both an excellent solubility in oily solvents and organic solvents and a retarding action which allows longer intervals between administrations of the steroid. Moreover, the novel cyclohexylcarbonates are useful intermediates for the synthesis of other steroids.

It is an object of the invention to provide novel cyclohexylcarbonates of hydroxylated steroids.

It is another object of the invention to provide a novel process for the preparation of cyclohexylcarbonates of hydroxylated steroids.

It is a further object of the invention to provide novel compositions comprising cyclohexylcarbonates of a hydroxylated steroid and a pharmaceutically acceptable oil base.

These and other objects and advantages will become obvious from the following detailed description.

The novel products of the invention are the cyclohexylcarbonates of hydroxylated steroids. While the invention includes the novel esters of any hydroxylated steroid, the preferred esters are those of the 17-ols of the androstane series, of the 21-ols of the pregnane series and of the 3-ols, 17-ols and 3,17-diols of the estrane series.

Examples of the 21-ols of the pregnane series suitable for esterification are cortisone, hydrocortisone, prednisolone, prednisone, 9α-fluoro-hydrocortisone, 9α-fluoro-prednisolone, 6α-methyl-prednisolone, triamcinolone, dexamethasone, 16α-methyl - 9α - fluoro-hydrocortisone, 6α-methyl-9α-fluoro-prednisolone, etc.

Examples of the 17-ols of the androstane series suitable for esterification are testosterone, 19-nor-testosterone, androstane-3β- or α-,17β- or α-diol, androstane-17β- or α-ol-3-one, Δ$^5$-androstene-3α- or β-,17β-diol, Δ$^{4,6}$-androstadiene-17β-ol-3-one, etc.

Examples of 3- and/or 17-ols of the estrane series suitable for esterification are estradiol, 9-dehydro-14-isoestradiol-17β, equilenin, estrone, estradiol-17α, etc.

The process of the invention comprises reacting the hydroxylated steroid with cyclohexyl chloroformate under alkaline conditions to form the cyclohexylcarbonate of the hydroxylated steroid and recovering the latter. If the hydroxylated steroid is a phenolic steroid of the estrane series, the reaction is preferably affected in the presence of an alkali metal base such as sodium or potassium hydroxide in an inert organic solvent such as ether or acetone. With other hydroxylated steroids, the reaction is preferably effected in the presence of an organic tertiary base such as pyridine. An excess of the organic tertiary base may be employed as solvent although other organic solvents may be used.

If the hydroxylated steroid has a hydroxy group which is not to be esterified, the hydroxy group may be first blocked such as by esterification with an acid which ester can be easily selectively saponified after the cyclohexylcarbonate is formed. For example the 17-cyclohexylcarbonate of estradiol is formed by acetylating estradiol in the 3-position by customary methods, reacting the 3-acetate of estradiol with cyclohexyl chloroformate to form the 3-acetate-17-cyclohexylcarbonate of estradiol and selectively saponifying the latter in the 3-position to form the 17-cyclohexylcarbonate of estradiol.

The compositions of the invention are comprised of cyclohexylcarbonates of steroid alcohols and a pharmaceutically acceptable oil base. The oil base may be any of the usual oil bases such as vegetable oils like olive oil.

Referring now the the figures.

FIG. 1 is a graph showing the anabolic activity of the cyclohexylcarbonate of testosterone.

FIG. 2 is a graph showing the androgenic effect of the cyclohexylcarbonate of testosterone.

In the following examples there are illustrated several preferred embodiments to illustrate the invention. However, it should be understood that the invention is not intended to be limited to the specific embodiments.

In the examples the melting points are the instantaneous melting points determined on the Kofler block and the temperatures are indicated in degrees centigrade.

EXAMPLE I

*Preparation of the Cyclohexylcarbonate of Testosterone*

10 gm. of testosterone were dissolved in 50 cc. of anhydrous pyridine. The mixture was cooled to +10 C. and 15 cc. of cyclohexyl chloroformate were introduced drop by drop under agitation. The reaction mixture took at first a rose coloration which became violet and the pyridine hydrochloride salt precipitated. The mixture was allowed to stand at room temperature overnight and then was poured into ice water. The aqueous suspension was agitated and extracted with ether. The extracts, after washing with hydrochloric acid and with water, were dried over sodium sulfate and evaporated to dryness under vacuum.

A residue of 17.9 gm. of the raw cyclohexylcarbonate of testosterone was obtained which was purified by subjecting it to chromatography through acidified alumina, and eluting with cyclohexane. 7.6 gm. (being a yield of 53%) of a yellow product were recovered, which was very soluble in vegetable oils such as olive oil, soluble in the usual organic solvents such as alcohol, ether, acetone, benzene, chloroform, cyclohexane and petroleum ether and insoluble in water and dilute aqueous acids and alkalis. The product had a specific rotation $$[\alpha]_D^{20} = +80°$$

(c.=0.6% in ethanol).

*Analysis.*—$C_{26}H_{38}O_4$; molecular weight=414.56. Calculated: C, 75.32%; H, 9.24%. Found: C, 75.2%; H, 9.3%.

This product is not described in the literature.

The cyclohexylcarbonate of testosterone, as has already been indicated has interesting pharmacological properties. It has particularly an intense and prolonged androgenic activity. It can be used similarily as testosterone and its acetate, but it possesses the great advantage of being very soluble in oils which allows its administration in a single massive dose whose action is of prolonged duration.

*Pharmacological Tests of the Cyclohexyl Carbonate of Testosterone*

*Determination of androgenic, anabolic and myotropic actions.*—The following tests were made according to the technique of Sakamoto et al., Proceed. Soc. Exp. Biol. Med., 76, 406 (1951). To male rats castrated at the age of 4½ weeks, a single subcutaneous injection of the product was made at an age of 7½ weeks. Then the rats were sacrificed at the following dates: 10, 17, 24, and 31 days after injection. The animals were autopsied after sacrifice and the desired organs were separated and weighed, in particular the seminal vesicles for a study of the androgenic effect and the kidneys and lifter muscle of the anus (levator ani) for a study of the renotropic and myotropic action.

The cyclohexylcarbonate of testosterone was dissolved in an oily solvent and administered at a dose of 25 mg. per rat. The results obtained are summarized in the following table and in FIGS. 1 and 2.

half hours at room temperature. Next 1.5 cc. of normal hydrochloric acid were added and the 17-cyclohexylcarbonate of estradiol precipitated. It was vacuum filtered, washed several times with water, dried and 0.400 gm. of a colorless solid (being a yield of 70%) having a melting point of 151° C. and a specific rotation $[\alpha]_D^{20} = +33.9°$ (c.=1% in chloroform) were obtained. Recrystallization from methanol furnished a product having an unchanged melting point. The product was soluble in ethanol, ether, acetone, benzene, chloroform and olive oil, slightly soluble in methanol and insoluble in water.

DETERMINATION OF THE ANDROGENIC EFFECT AND THE ANABOLIC ACTION

| Treatment | Number of animals | Age of rats in weeks | Duration of action in days | Weight of rats in gm. | Weight of seminal vesicles in mg. | Rf | Rs | lf | ls |
|---|---|---|---|---|---|---|---|---|---|
| Control lot | 4 | 9 | 0 | 150 | 7.2 | 4.6 | 1 | 0.22 | 0.05 |
| Cyclohexylcarbonate of testosterone | 8 | 9 | 10 | 175 | 375 | 4.6 | 1 | 0.59 | 0.12 |
| Control lot | 4 | 10 | 0 | 169 | 6.2 | 4.4 | 1 | 0.19 | 0.04 |
| Cyclohexylcarbonate of testosterone | 8 | 10 | 17 | 180 | 758 | 5.4 | 1.1 | 0.8 | 0.18 |
| Control lot | 4 | 11 | 0 | 185 | 6.7 | 4.3 | 1 | 0.18 | 0.04 |
| Cyclohexylcarbonate of testosterone | 8 | 11 | 24 | 199 | 737 | 4.6 | 1.1 | 0.6 | 0.16 |
| Control lot | 4 | 12 | 0 | 204 | 6.7 | 4.2 | 0.9 | 0.19 | 0.04 |
| Cyclohexylcarbonate of testosterone | 8 | 12 | 31 | 189 | 728 | 4.6 | 1.05 | 0.80 | 0.18 |

NOTE.—Meanings: $Rf = \dfrac{\text{Weight of fresh kidneys} \times 1{,}000}{\text{body weight}}$   $lf = \dfrac{\text{Weight of fresh levator ani} \times 1{,}000}{\text{body weight}}$ $Rs = \dfrac{\text{Weight of dry kidneys} \times 1{,}000}{\text{body weight}}$   $ls = \dfrac{\text{Weight of dry levator ani} \times 1{,}000}{\text{body weight}}$ As can be seen from examination of these results, the cyclohexylcarbonate of testosterone possesses an intense and durable androgenic effect and a marked anabolic effect.

*Determination of Acute Toxicity*

Tests of acute toxicity were made on mice of the Rockland strain weighing between 18 and 22 gm. The cyclohexylcarbonate of testosterone was dissolved in an oily solvent and injected subcutaneously to a lot of 10 mice at a dosage of 250 mg./kg. The animals were kept under observation for a period of one week after injection.

No symptoms of intoxication or mortality were noted in the course of this period. The compound is thus not toxic even at a dose of 250 mg./kg.

EXAMPLE II

*Preparation of the 17-Cyclohexylcarbonate of Estradiol*

A. *Esterification of the 3-monoacetate of estradiol.—* 0.950 gm. of the 3-monoacetate of estradiol were introduced into 10 cc. of anhydrous pyridine. The mixture was cooled to 0° C. and, drop by drop, 0.740 gm. of cyclohexylchloroformate were added. The reaction mixture was allowed to stand at room temperature overnight. Next several drops of water were added and then the pyridine was removed under vacuum. The residue after distillation was dissolved in 10 cc. of methylene chloride, washed with hydrochloric acid, then with sodium bicarbonate and water, dried and evaporated to dryness under vacuum. The residue crystallized from methanol and furnished 0.900 gm. of the 3-acetate-17-cyclohexylcarbonate of estradiol having a melting point of 114° C. and a specific rotation $[\alpha]_D^{20} = +28.7°$ (c.=0.8% in chloroform).

The product occurred in the form of colorless leaflets, soluble in methanol, ethanol, acetone, benzene, chloroform and olive oil, and insoluble in ether and water.

*Analysis.—*$C_{27}H_{36}O_5$; molecular weight=440.56. Calculated: C, 73.60%; H, 8.24%. Found: C, 73.3%; H, 8.3%.

This product is not described in the literature.

B. *Saponification of the 3-acetate-17-cyclohexylcarbonate of estradiol.—*0.660 gm. of the 3-acetate-17-cyclohexylcarbonate of estradiol were introduced into a solution of 1.5 cc. of normal sodium hydroxide in 10 cc. of methanol and the mixture was agitated for four and a half hours at room temperature. Next 1.5 cc. of normal hydrochloric acid were added and the 17-cyclohexylcarbonate of estradiol precipitated. It was vacuum filtered, washed several times with water, dried and 0.400 gm. of a colorless solid (being a yield of 70%) having a melting point of 151° C. and a specific rotation $[\alpha]_D^{20} = +33.9°$ (c.=1% in chloroform) were obtained.

*Analysis.—*$C_{25}H_{34}O_4$; molecular weight=398.52. Calculated: C, 75.34%; H, 8.60%. Found: C, 75.4%, H, 8.6%.

This product is not described in the literature.

The 17-cyclohexylcarbonate of estradiol has interesting pharmacological properties, as has already been indicated. It has a particularly prolonged estrogenic action. It can be utilized as similarly as estradiol and its acetate and possesses, because of its elevated solubility in olive oil, the great advance of allowing the administration of a single massive dose whose effect continues for a prolonged duration.

*Pharmacological Study of the 17-Cyclohexyl-Carbonate of Estradiol*

The 17-cyclohexylcarbonate of estradiol possesses, because of its elevated solubility in olive oil, the advantage of allowing administration of a single massive dose whose effect manifests itself for a prolonged period of time. The estrogenic activity of 17-cyclohexylcarbonate of estradiol has been determined by the test of Allen and Doisy, such as described by Madam Feyel-Cabanes, C.R. Soc. Biol., 150, 1881 (1956).

The test of estrogenic activity was made on a lot of castrated rats weighing 140 gm.±20 gm. divided into groups of four. Each rat received a single subcutaneous injection of 17-cyclohexylcarbonate of estradiol in solution in 0.2 cc. of olive oil containing 5% benzyl alcohol. Vaginal smears were made each day at the same hour. Only the smears exclusively showing keratinized cells were retained as positives. The duration of estrus produced by the same dose of the 3-benzoate and the 17-cyclohexylcarbonate of estradiol were determined under these experimental conditions.

It was found that for the same dose of 10γ per rat, the estrus provoked by the 3-benzoate of estradiol lasted an average of 3 days whereas the estrus provoked by the 17-cyclohexylcarbonate of estradiol persisted an average of 8.2 days. The 17-cyclohexylcarbonate of estradiol thus has an activity much more prolonged than that of the 3-benzoate of estradiol at the same dosage.

*Test of Acute Toxicity*

A test of acute toxicity was effected on mice of the Rockland strain weighing between 18 and 22 gm. 17-cyclohexylcarbonate of estradiol was placed in solution in olive oil at a concentration of 2.5 mg./cc. It was injected into a lot of 10 mice subcutaneously in a volume of 1/100 cc. per gm. of mice, being a dose of 25 mg./kg. The animals were held under observation for a period of one week. No symptoms of intoxication or mortality were revealed.

17-cyclohexylcarbonate of estradiol is thus non-toxic, even at a dose of 25 mg./kg.

EXAMPLE III

*Preparation of the 3-Cyclohexylcarbonate of Estradiol*

1.350 gm. of estradiol were dissolved in 10 cc. of hot acetone. The solution was cooled, then successively by fractions and at intervals of one-half hour, a total of 20 cc. of 1 N sodium hydroxide and 1.8 gm. of cyclohexyl-chloroformate in 8 cc. of acetone were added. The reaciton mixture was agitated for two hours at room temperature, then reduced under vacuum to a small volume. The mixture was extracted with benzene and the extracts were washed with sodium hydroxide, with water then dried and evaporated to dryness under vacuum. 2 gm. of the 3-cyclohexylcarbonate of estradiol were obtained.

The product was crystallized from methanol and 1.5 gm. of solvated product containing half a molecule of methanol melting at 95–97° C. and having a specific rotation $[\alpha]_D^{20} = +53°$ (c.=1% in chloroform) were recovered. The product occurred in the form of colorless needles and was soluble in alcohol, ether, acetone, benzene, chloroform, dioxane, ethyl acetate and olive oil, slightly soluble in cyclohexane and insoluble in water, pentane and petroleum ether.

*Analysis.*—(Product desolvated by heating under vacuum to 100° C.) $C_{25}H_{34}O_4$; molecular weight=398.52. Calculated: C, 75.34%; H, 8.60%. Found: C, 75.3%; H, 8.6%.

This product is not described in the literature.

EXAMPLE IV

*Preparation of the 3,17-di-(Cyclohexylcarbonate) of Estradiol*

1 gm. of estradiol was dissolved in 10 cc. of anhydrous pyridine. The solution was cooled to 0° C. and 1.3 gm. of cyclohexyl-chloroformate were added drop by drop. The reaction mixture was allowed to stand at room temperature for a period of sixteen hours. Next several drops of water were added, and the pyridine was removed under vacuum. The residue was redissolved in 10 cc. of methylene chloride. The solution was washed successively with hydrochloric acid, sodium hydroxide and water, dried, and then the methylene chloride was evaporated. The residue was crystallized from acetone and supplied 1.410 gm. of 3,17-di-(cyclohexylcarbonate) of estradiol having a melting point of 116° C. and a specific rotation $[\alpha]_D^{20} = +22.6°$ (c.=1% in chloroform). A second recrystallization from acetone did not change the melting point.

The product occurred in the form of colorless rodlets and was soluble in alcohol, ethyl and isopropyl ether, acetone, benzene, chloroform, methylene chloride and olive oil, and insoluble in water.

*Analysis.*—$C_{32}H_{44}O_6$; molecular weight=524.67. Calculated: C, 73.25%; H, 8.45%. Found: C, 73.5%; H, 8.4%.

The infrared spectrum confirmed the existence of two carbonyl groups by bands at 1755 cm.$^{-1}$ for the 3-position and at 1737 cm.$^{-1}$ for the 17-position.

This compound is not described in the literature.

EXAMPLE V

*Preparation of the 21-Cyclohexylcarbonate of Prednisone*

1.4 gm. of prednisone were dissolved in 14 cc. of anhydrous pyridine, 1.1 cc. of cyclohexyl-chloroformate were added at 0° C. drop by drop, and the reaction mixture was allowed to stand overnight at room temperature. The next day it was heated to 40° C. for a period of four hours, cooled, and after addition of several drops of water, the pyridine was removed under vacuum. The residue was dissolved in 10 cc. of benzene and the solution was washed with hydrochloric acid solution, then with water, and dried over sodium sulfate. After evaporation under vacuum, 1.7 gm. of the 21-cyclohexylcarbonate of prednisone were obtained and was crystallized from isopropyl ether and recrystallized from methanol. The yield of the pure product was 1.2 gm. (being 70%). The product melted at 200–202° C. and had a specific rotation $[\alpha]_D^{20} = +168°$ (c.=1% in chloroform).

The product occurred in the form of colorless rodlets and was soluble in acetone, benzene, chloroform, alcohol, tetrahydrofuran, ethyl acetate and olive oil, and insoluble in ethyl ether, isopropyl ether and water.

*Analysis.*—$C_{28}H_{36}O_7$; molecular weight=484.56. Calculated: C, 69.40%; H, 7.48%. Found: C, 69.4%; H, 7.5%.

This product is not described in the literature.

EXAMPLE VI

*Preparation of 3β-Benzoxy 7β-Cyclohexyloxy-Carbonyloxy $\Delta^5$-Cholestene*

1 gm. of 3β-benzoxy 7β-hydroxy $\Delta^5$-cholestene was dissolved in 10 cc. of anhydrous pyridine. To this solution, previously cooled to −30° C., 0.58 cc. of cyclohexyl chloroformate was added, and the reaction mixture allowed to stand for 12 hours at 0° C. The excess of cyclohexyl chloroformate was then destroyed by introducing a few drops of water into the reaction mixture, which was then allowed to stand for 30 minutes at room temperature. The reaction mixture was then poured into 100 cc. of ice-cooled water containing 11 cc. of concentrated hydrochloric acid. The mixture thus obtained was extracted 4 times with methylene chloride. The combined extracts were washed with a saturated solution of sodium bicarbonate, then with water until neutral, and dried over sodium sulphate. Filtration and evaporation into a vacuum yielded an oily product, which was taken up with 10 cc. of acetone, in which the product crystallized. The product was then ice-cooled during 30 minutes, suction-filtered, and washed twice with 1 cc. of ice-cooled acetone. The yield was 0.95 gm. (=76%) of crystallized 3β-benzoxy 7β-cyclohexyloxy carbonyloxy $\Delta^5$-cholestene, melting at 168–170° C., $[\alpha]_D^{20} = +65°$ (c.=1% chloroform), present in the form of colorless needles, soluble in ethanol and chloroform, less soluble in benzene, and insoluble in water and ether.

*Analysis.*—$C_{41}H_{60}O_5$, molecular weight=632.89. Calculated: C, 77.8%; H, 9.5%. Found: C, 78.1%; H, 9.6%.

This compound is not described in the literature.

Various modifications of the process of the invention may be made without departing from the spirit or scope thereof, and it is to be understood that the invention is to be limited only as defined in the appended claims.

We claim:

1. The cyclohexylcarbonates of a hydroxylated steroid selected from the group consisting of cortisone, hydrocortisone, prednisone, prednisolone, 9α-fluoro-hydrocortisone, 9α-fluoro-prednisolone, 6α-methyl-prednisolone, triamcinolone, dexamethasone, 16α-methyl - 9α - fluoro-hydrocortisone, 6α-methyl-9α-fluoro-prednisolone, testosterone, 19 - nor - testosterone, androstane-3β,17β-diol, androstane-3α,17α-diol, androstane-3α,17β-diol, androstane-3β,17α-diol, androstane-17β-ol-3-one, androstane-17α-ol-3-one, $\Delta^5$-androstene-3α,17α-diol, $\Delta^5$-androstene-3β,17β-diol, $\Delta^{4,6}$-androstadiene-17β-ol-3-one, estradiol, 9-dihydro-14-isoestradiol-17β, equilenin, estrone, estradiol-17α and 3β-benzoxy-$\Delta^5$-cholestene-7β-ol.

2. An injectable solution having prolonged activity which comprises an effective amount of cyclohexylcarbonates of a hydroxylated steroid selected from the group consisting of cortisone, hydrocortisone, prednisone, prednisolone, 9α-fluoro-hydrocortisone, 9α-fluoro-prednisolone, 6α-methyl-prednisolone, triamcinolone, dexamethasone, 16α-methyl-9α-fluoro-hydrocortisone, 6α-methyl-9α-fluoro-prednisolone, testosterone, 19 - nor - testosterone, androstane-3β,17β-diol, androstane-3α,17α-diol, androstane-3α,17β-diol, androstane-3β,17α - diol, androstane-17β-ol - 3 - one, androstane-17α-ol-3-one, Δ$^5$-androstene-3α,17β-diol, Δ$^5$-androstene-3β,17β-diol, Δ$^{4,6}$-androstadiene-17β-ol-3-one, estradiol, 9-dihydro - 14 - isoestradiol-17β, equilenin, estrone, estradiol-17α and 3β-benzoxy-Δ$^5$-cholestene-7β-ol and a pharmaceutically acceptable oil base.

3. The solution of claim 2 wherein the said cyclohexylcarbonate is the cyclohexylcarbonate of testosterone.

4. The solution of claim 2 wherein the said cyclohexylcarbonate is the 17-cyclohexylcarbonate of estradiol.

5. The cyclohexylcarbonate of testosterone.
6. The 3-cyclohexylcarbonate of estradiol.
7. The 17-cyclohexylcarbonate of estradiol.
8. The 3,17-di(cyclohexylcarbonate) of estradiol.
9. The 21-cyclohexylcarbonate of prednisone.

10. A process for the preparation of the cyclohexylcarbonate of a hydroxylated steroid selected from the group consisting of 17-ols of the androstane series, 21-ols of the pregnane series and the 3-ols, 17-ols and 3,17-diols of the estrane series which comprises reacting said hydroxylated steroid with cyclohexyl chloroformate under alkaline conditions to form the cyclohexylcarbonate of the hydroxylated steroid and recovering the latter.

11. The process of claim 10 wherein the reaction is effected in the presence of an alkali metal base in an inert organic solvent.

12. The process of claim 10 wherein the reaction is effected in the presence of pyridine.

13. 3β - benzoxy-7β-cyclohexyloxycarbonyloxy-Δ$^5$-cholestene.

References Cited in the file of this patent

UNITED STATES PATENTS

| | | |
|---|---|---|
| 2,787,631 | Stevens | Apr. 2, 1957 |
| 2,917,534 | Sims et al. | Dec. 15, 1959 |